Patented May 25, 1926.

1,586,509

UNITED STATES PATENT OFFICE.

ROLFE E. GLOVER, JR., AND THOMAS HUNTON ROGERS, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF TREATING CRUDE CYANIDE.

No Drawing.     Application filed March 12, 1921.  Serial No. 451,768.

This invention relates to production of alkali-metal cyanides from crude cyanide containing a soluble alkaline earth metal salt.

The main object of our invention is to provide a new and improved method for obtaining substantially pure solutions of sodium or other stable metal cyanide from crude cyanides containing soluble calcium, or its equivalent.

The crude cyanide to be used as raw material may be, for example, a product, obtainable in the open market, which contains as soluble constituents, 15–25% cyanogen, 11–20% soluble calcium, 14–17% sodium, 22–25% chlorine; with about 15% CaO and 5–10% of various inert impurities. This crude cyanide is made from cyanamid and may be considered as containing 25–45% $Ca(CN)_2$ and 35–42% NaCl. This crude material is not adapted to direct use in many processes, as it does not form a stable or readily usable solution when leached with water. The presence of calcium in cyanide solutions causes decomposition. Presence of the products of decomposition, azulmic acid, etc., induces and hastens further decomposition.

We have discovered that if we leach the crude cyanide and at the same time free the solution of calcium, substituting sodium or other alkali-metal therefor, a relatively stable solution of an alkali-metal cyanide is obtained, which, except for the presence of sodium chloride, is of high degree of purity. This solution may be used for various processes as, for instance, gold extraction, generation of HCN, and many chemical syntheses.

If, in converting the crude cyanide into sodium cyanide, the crude material be leached with water, the insoluble matter filtered off, and the calcium precipitated from the filtrate by addition of, for instance, sodium carbonate, there will result a serious loss of cyanide due to the fact that a considerable amount of combined calcium remains in solution for a substantial period before precipitation is effected. Furthermore, the solution from which the calcium has been precipitated tends to become "thick", due to the formation and deposition of a brown decomposition product, azulmic acid, which renders filtration much more difficult. The mere addition of crude cyanide to the leaching liquor in large quantity causes so much "thickness" in the solution that it has not been practicable to obtain by this procedure solutions stronger than 17% NaCN.

We have found it possible to avoid the above difficulties by accomplishing both the leaching of the crude product and the precipitation of calcium as a single step. In this way the combined calcium is allowed to remain in solution only momentarily since, by keeping the precipitating agent in slight excess throughout the leaching, the calcium is removed from the solution as rapidly as it is dissolved. Some difficulty may be experienced through precipitation of the calcium salt in a gelatinous or colloidal condition if the reaction is allowed to occur between strong solutions of calcium ion and the calcium-precipitating ion. We have obviated this by adding the two materials, the crude cyanide and the precipitating agent, to the leach liquor in small batches in the proper ratio over a longer period of time. The addition of a batch of precipitating agent should precede that of the crude cyanide.

We have found that the amount of precipitating agent ordinarily depends on the cyanide content of the crude cyanide, and can be calculated from that, as well as from the soluble calcium content. A sufficient amount of the precipitating agent may be added to cause a transformation of the calcium hydroxide present also into a less soluble salt, as for instance, into calcium carbonate (when sodium carbonate is the precipitating agent). This however, is not necessary, as the solubility of calcium hydroxide is diminished in the presence of the other salts (NaCN, NaCl and NaOH formed by causticization of excess $Na_2CO_3$ by the $Ca(OH)_2$ in the crude cyanide sludge), and the calcium concentration resulting is not sufficient to cause serious decomposition.

We have found it convenient to prepare 20–25% sodium cyanide solutions for use, but the general process embraces the preparation of solutions of any concentration up to that corresponding to the solubility of sodium cyanide in water saturated with sodium chloride, the degree of concentration of the solution being controlled by the ratio of water to crude cyanide employed. The precipitating agent may be the alkali-metal salt of any acid whose calcium salt is substantially insoluble, such as sodium or potassium sulphate, but we have found it most convenient to use sodium carbonate for this purpose.

Our preferred procedure may be illustrated by the following example: Two parts by weight of water are used to leach one part by weight of the crude cyanide. A quantity of sodium carbonate chemically equivalent to the soluble calcium in the crude cyanide, with about five percent excess, is weighed out. These two constituents, the crude cyanide and the sodium carbonate, are either mixed thoroughly and added to the water, or else added in equivalent batches, in either case slowly and over a period of time. In the latter case the addition of a batch of sodium carbonate precedes that of the crude cyanide. The calcium immediately upon going into solution, either as the chloride or cyanide, is precipitated according to the reactions:

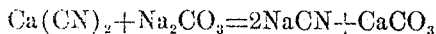

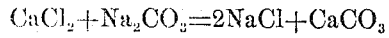

In both cases the whole amount of material is added in 12 or 15 batches over a period of 1–2 hours. The mixture is meanwhile kept in a state of rapid agitation, in order to ensure the complete disintegration of the flakes of crude cyanide, and the solution of its contained cyanide. The resulting slurry, after complete solution is effected, is filtered and the solution of sodium cyanide obtained. The sludge may be washed free of cyanide in order to increase the recovery.

For the production of stronger solutions, either the filtered solution, obtained as described, or the wash liquor, may be used to leach an additional quantity of the crude cyanide, using the same procedure as with water. Furthermore, if the sodium hydroxide concentration of the purified solution is too great, due to involuntary addition of too great an excess of sodium carbonate, resulting in the reaction

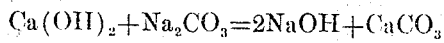

this free-alkalinity may be reduced to the desired extent by addition of corresponding quantities of the crude cyanide before or after the sludge is filtered off.

We have studied the decomposition of solutions of sodium cyanide, both in the presence of a considerable proportion of dissolved calcium, and in the presence of a very small proportion of calcium corresponding to the solubility of $Ca(OH)_2$ which is always present in the sludge due to the CaO content of the crude cyanide. We have thus proven the serious decomposability of solutions of calcium cyanide, as compared with the relatively great stability of solutions from which the calcium has been precipitated. Two slurries and a clear solution were investigated, the first slurry (1) being obtained by leaching crude cyanide with a 10% solution of sodium cyanide, without addition of sodium carbonate, hence containing much calcium in solution, as well as in the sludge; the second slurry (2) being obtained by leaching crude cyanide with a 10% solution of sodium cyanide, with addition of sodium carbonate in amount slightly in excess of that equivalent to the soluble calcium, thus leaving calcium in the sludge, and in the solution also, but only to the extent of the solubility of $Ca(OH)_2$; and clear solutions (3) being obtained by leaching and filtering as described in our preferred procedure, and thus saturated with $Ca(OH)_2$. The percentages of cyanide lost by decomposition are given in the following tables:

Percentage NaCN loss by decomposition.

| | 1 hr. | 4 hrs. | 1 day. | 1 week. |
|---|---|---|---|---|
| Temperature 60° C.: | Per cent | Per cent | Per cent | Per cent |
| (1) 16% NaCN solution (4% calcium)+solids | 6.10 | 7.2 | 19.30 | |
| (2) 20% solution+solids | 0.85 | 1.57 | 5.5 | 23.1 |
| (3) 20% solution | 0.06 | 1.62 | 3.65 | 14.8 |
| (3) 11.5% solution | 0.0 | 3.1 | 8.5 | 15.3 |
| Temperature 30° C.: | | | | |
| (1) 16% NaCN solution (4% calcium)+solids | 7.1 | 7.15 | | |
| (2) 20% solution+solids | 0.43 | 1.66 | 1.75 | 3.75 |
| (3) 20% solution | 0.02 | 0.35 | 1.06 | 4.2 |

Our decomposition experiments also prove that greater loss of cyanide, whether or not free from calcium, results from an elevated temperature and from allowing the solutions and slurries to stand without immediate use. In our extraction we have therefore handled the solutions and slurries as rapidly as possible and have, by cooling means, prevented the temperature rise which tends to take place during leaching.

We claim:—

1. The process of treating a crude cyanide containing a soluble alkaline earth metal salt which comprises dissolving said salt and then immediately effecting precipitation of the alkaline earth metal.

2. The process of treating a crude cyanide containing a soluble alkaline earth metal salt which comprises subjecting said crude cyanide to the action of a solvent for said salt, said solvent containing a substance capable of reacting with dissolved portions of said salt to form an insoluble alkaline earth metal compound.

3. The process of treating a crude calcium cyanide which comprises subjecting said cyanide to the action of a solvent therefor and effecting precipitation of calcium ions in the form of an insoluble calcium compound as soon as they are formed.

4. The process of treating a crude calcium cyanide which comprises dissolving the calcium salt in water containing a substance capable of reacting with the calcium in solution to form an insoluble calcium compound.

5. The process of treating a crude cyanide containing a soluble alkaline earth metal salt which comprises dissolving said salt and then immediately effecting precipitation of the alkaline earth metal while maintaining the solution at a temperature below 40° C.

6. The process of producing an alkali-metal cyanide from a crude cyanide containing an alkaline earth metal salt which comprises treating said crude cyanide with a water solution of an alkali-metal carbonate.

7. The process of producing sodium cyanide from crude calcium cyanide which comprises treating said crude cyanide with a water solution of sodium carbonate to cause precipitation of the calcium as soon as it becomes dissolved.

8. The process of producing sodium cyanide from crude calcium cyanide which comprises treating said crude cyanide with water in the presence of sodium carbonate to form calcium carbonate and filtering off the latter along with other insoluble matter which may have been present in the crude cyanide.

9. A process as defined in claim 2 in which the ratio of solvent to soluble alkaline earth metal salt is such that the alkaline earth metal can be precipitated from the resulting solution of said salt in a form which makes it readily removable by filtration.

10. A process as defined in claim 7 in which the proportion of calcium undergoing precipitation at any one time is small compared to the proportion of water present.

11. A process as defined in claim 8, in which the proportion of calcium undergoing precipitation at any one time is small compared to the proportion of water present.

In testimony whereof we affix our signatures.

ROLFE E. GLOVER, Jr.
THOMAS HUNTON ROGERS.